May 6, 1952     P. E. CHAPMAN ET AL     2,595,332
WINDING MACHINE

Filed Dec. 29, 1945     3 Sheets-Sheet 1

INVENTORS:
PENROSE E CHAPMAN
P. EMBREE CHAPMAN, JR

BY Rodney Bedell
ATTORNEY

May 6, 1952     P. E. CHAPMAN ET AL     2,595,332
WINDING MACHINE
Filed Dec. 29, 1945     3 Sheets-Sheet 2
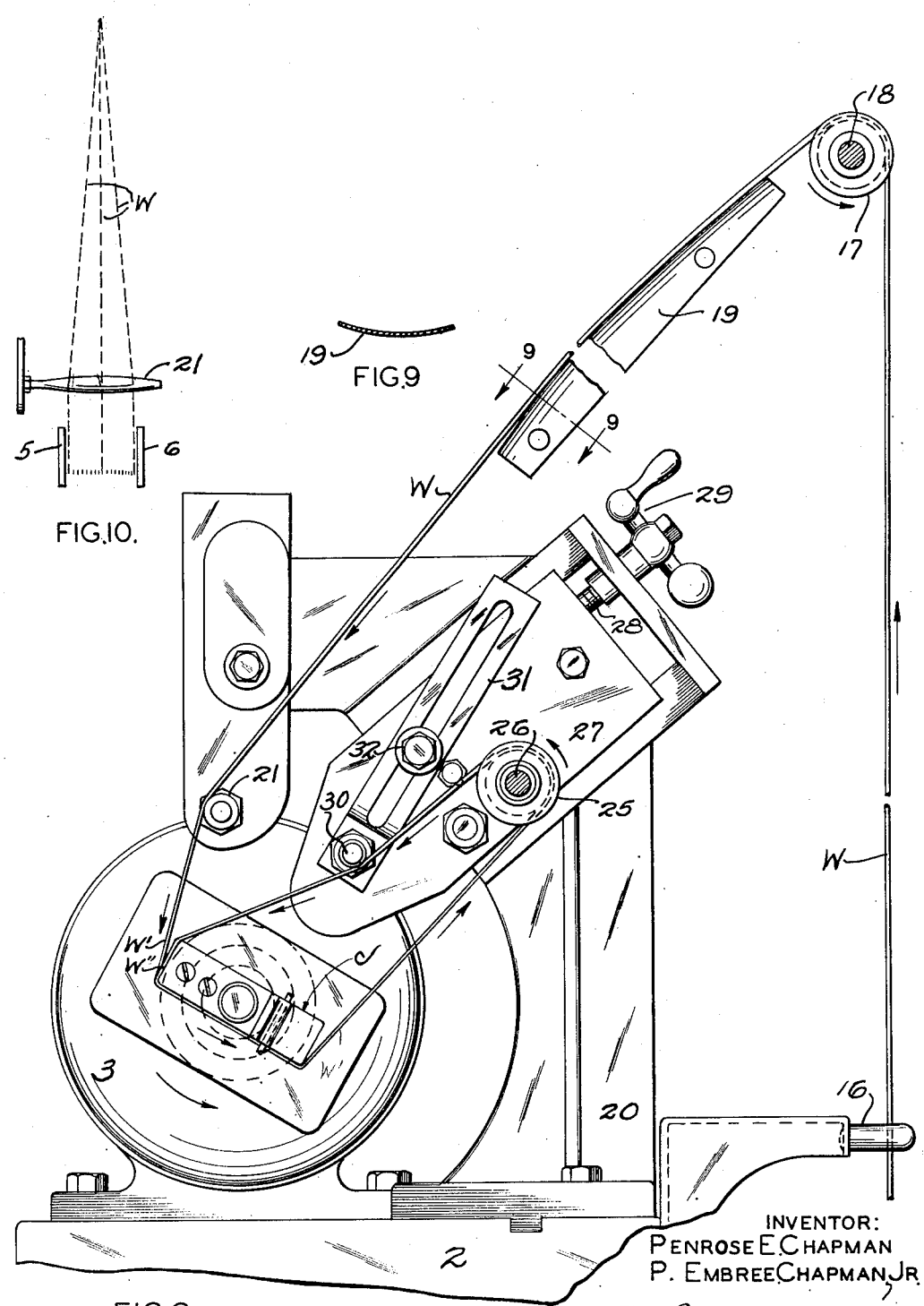
INVENTOR:
PENROSE E. CHAPMAN
P. EMBREE CHAPMAN, JR.
BY Rodney Bedell
ATTORNEY May 6, 1952 P. E. CHAPMAN ET AL 2,595,332
WINDING MACHINE
Filed Dec. 29, 1945 3 Sheets-Sheet 3

INVENTOR:
PENROSE E CHAPMAN
P. EMBREE CHAPMAN, JR
BY Rodney Bedell
ATTORNEY

Patented May 6, 1952

2,595,332

UNITED STATES PATENT OFFICE 2,595,332

WINDING MACHINE

Penrose E. Chapman and Penrose Embree Chapman, Jr., St. Louis, Mo.; Emmeline T. Chapman administratrix of said Penrose Embree Chapman, Jr., deceased Application December 29, 1945, Serial No. 638,141

9 Claims. (Cl. 242—9)

The invention relates to machines for winding wire, cord, or other elongated material, in layers, upon any suitable device as a jig, spool, arbor, core, sleeve, etc. Any such elongated material will be called herein wire, and anything upon which wire can be wound will be called herein jig. For the purpose of illustration, but without limitation, the invention is illustrated and described in a layer coil winding machine.

The general object of the invention is to automatically and accurately wind coils in smooth layers and to do so at high speed. A more specific object is to wind effectively not only easy to wind coils, but those which are difficult to wind from any cause, such as coils with many layers, sharply angular coils, coils with straight or nearly straight sides, and coils formed of relatively small diameter wire, etc.

In winding coils under favorable conditions, there is a slight tendency for the wire to feed itself in a layer and to do so without any mechanism. In the invention this phenomenon is augmented by the means utilized so that even difficult coils are rapidly wound in layers, at high speeds, with a remarkable degree of accuracy and freedom from mishaps.

The winding of coils in layers usually requires that the wire be fed to the coil or jig substantially perpendicular to the jig axis; or only inclined as small amount, as when fed from a great distance, especially when the wire is comparatively small and/or the coil has long straight sides. It is an object of the present invention to obtain the effect of a minimum inclination of the wire, notwithstanding the fact that from a practical standpoint it must be fed to the jig from a nearby source of varying position such as a rotating spool.

These and other detail objects, as will appear from the following description, are attained by the structure illustrated in the accompanying drawings, in which—

Figure 2 is an end view of the machine indicating the parts shown in Figure 1 and cooperating structure spaced from the rotating jig.

Figure 9 is a detailed section on the line 9—9 of Figure 2.

Figure 10 is a diagram indicating a function of at least one of the damping devices.

Figure 7:
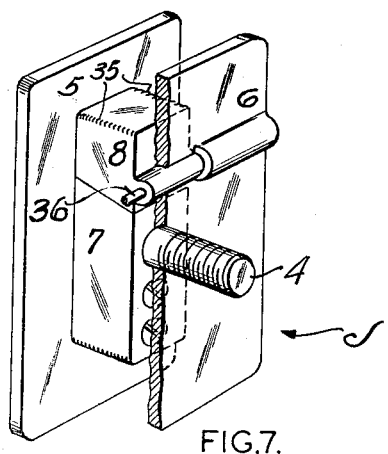
Figure 7 is a perspective of the jig with a part broken away.
Figure 3:
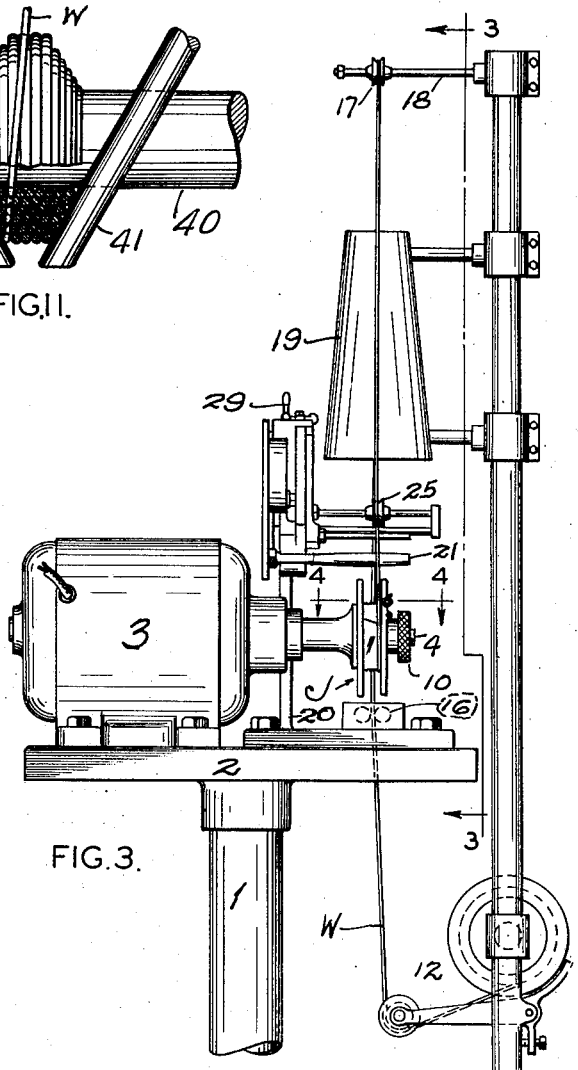
Figure 3 is a front view of the structure indicated in Figures 1 and 2.
Figure 8:
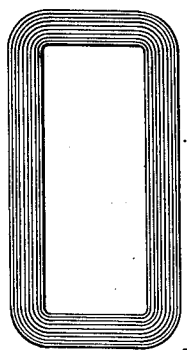
Figure 8 is a side view of a completed coil wound on the jig.

The winding mechanism may be mounted on a pedestal 1 with a table 2 and includes a motor 3 for rotating a suitable jig. The two-part collapsible jig J (Figure 7) comprises an arbor 4, cheek plates 5 and 6 and intermediate core elements 7 and 8 pivotally assembled with each other and with plates 5 and 6 and adapted to be positioned as shown in Figure 7 by tightening a clamp nut 10 (Figure 3). When nut 10 is unscrewed, the jig may collapse to release a coil wound thereon.

The wire W being wound is tensioned by any suitable means, such as a spool handling and tension device 12, from which the wire W is led to guides 16, then over a vibration damping sheave 17, which may rotate and slide freely on its shaft 18. From sheave 17 the wire may pass over another damper 19 which preferably is made convex longitudinally and transversely to the line of travel of the wire W over it.

A bracket 20 may be mounted on table 2 and may be adjustable lengthwise of arbor 4 and may mount an elongated vibration damper 21 parallelling arbor 4 and preferably slightly convex lengthwise. When the wire W passes the vibration damper 21, it lays down on the jig J, or a coil thereon, for a half turn and then is picked up by a sheave 25 and relaid back on jig J or a coil thereon. Vibrations are likely to be set up between sheave 25 and the jig or coil and to prevent such vibrations, another damper 30 is interposed between them. Sheave 25 is freely slidable and rotatable upon a spindle 26 extending substantially parallel to arbor 4 from any suitable support as a slide plate 27 which is adjustable on bracket 20 and may be readily positioned by a screw 28 having a handle 29. The stationary damper 30 projects from a slotted support 31 slidably and pivotally mounted on plate 27 and adjustably positioned as by a clamp bolt 32.

Figure 4:
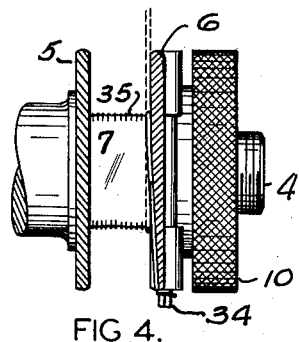
Figure 4 is a section through the rotating jig at the beginning of a winding operation, showing the end of the wire secured to the jig. The section is taken on the line 4—4 of Figure 3.
Figure 5:
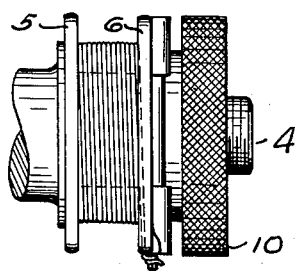
Figure 5 is a similar view showing a completed coil wound on the jig.
Figure 6:
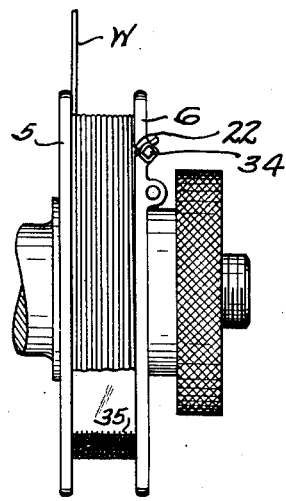
Figure 6 is a front view of the structure shown in Figure 5, a part being sectioned to illustrate the type of winding produced.

At the beginning of a coil winding operation the tensioned wire W is placed manually, as indicated above, and its end portion seated in a laterally opening groove 22 (Figure 6) in the side of the jig cheek plate 6, the wire terminal being twisted about a snubbing pin 34 on cheek plate 6. The jig core elements 7 and 8 are provided with grooves 35 (Figure 4) opening radially of the jig axis and here shown on the corners only of the cores. These grooves receive the first layer of the winding and position the successive turns as the layer is wound until the wire is immediately adjacent to the left-hand cheek plate 5.

Figure 1:
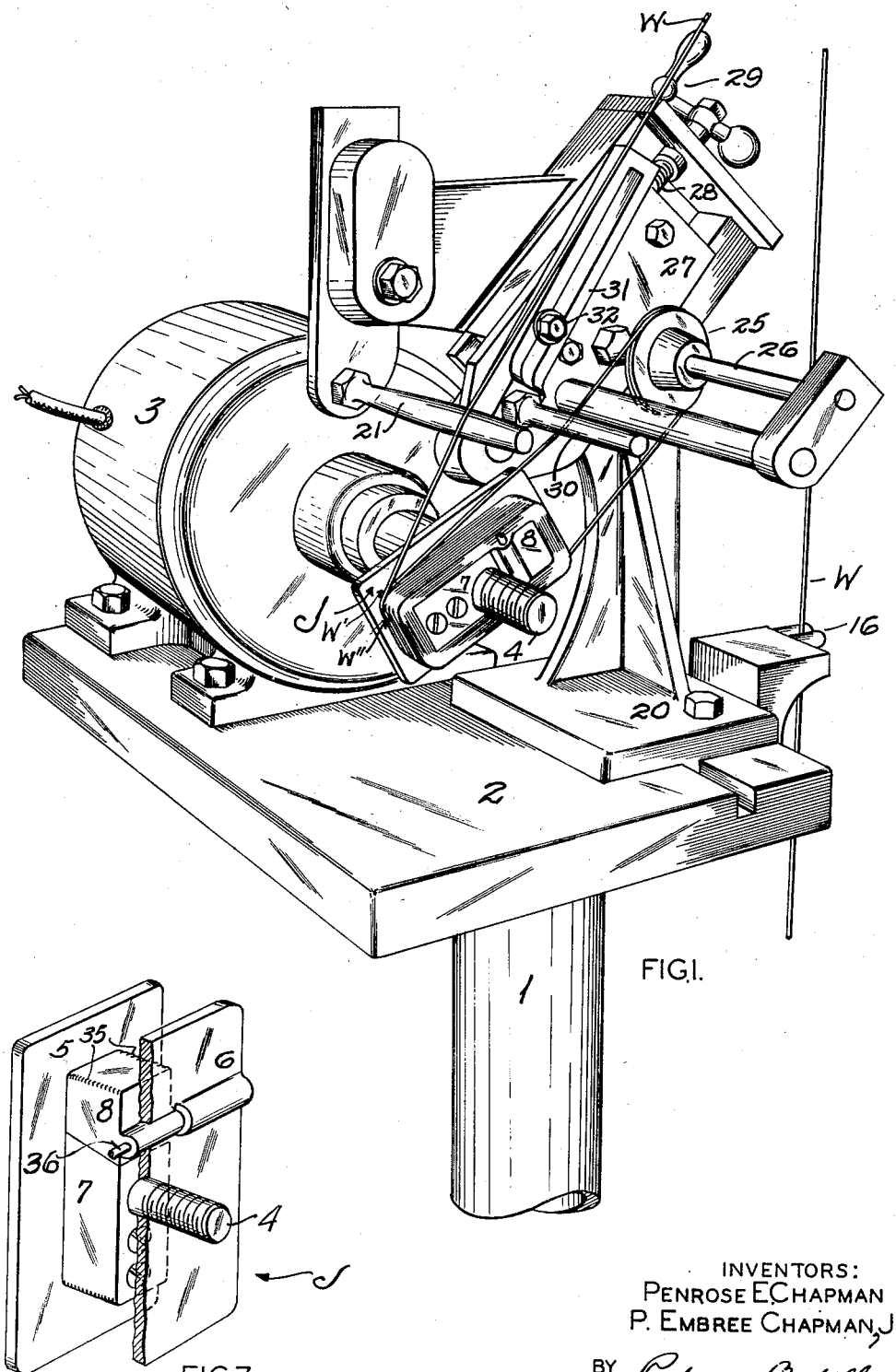
Figure 1 is a perspective showing a rotating jig, about which the wire is wound, and adjacent portions of the machine.

Then the next succceding turn will climb up the last groove-received turn and will position the following turn. Each succeeding turn will position the next turn. At the same time the portion of the supply wire indicated at W' (Figures 1 and 2) will be pressing the turn just relaid, indicated at W'', against the next previously wound turn.

These turns may be seated in the gutters between the turns of the first layer. When the winding reaches the right-hand end of the jig, the turn adjacent to cheek plate 6 may function as did the last groove-received turn adjacent cheek plate 5 and elevate the first turn of the third layer of the winding so that the winding will be to the left. Hence, the positioning of the successive turns of the wire and the reversal of the direction of the winding will be automatic until the operation is completed at which time the rotation of the jig will be stopped manually and the coils will be tied in the usual manner.

After tying the coil, clamp nut 10 is removed and cheek plate 6 moved away from the remainder of the jig, permitting core element 8 to swing on its pivot 36 to collapse the jig so that the coil may be removed easily from the jig.

The relaying damper sheave 25, over which the wire passes from and then back to the jig, is readily adjustable, towards and away from the jig, by elements 28 and 29. This enables the operator to position the relaying sheave so that kinks in the wire resulting from its original contact with the jig corners will come at jig corners when the wire is relaid back to the jig. Also, this provides for ready and accurate positioning of the sheave 25 so as to best eliminate vibrations of the wire and to avoid other mishaps affecting the accuracy or speed of the winding.

Each of the vibration dampers at various points in the travel of the wire between the source of supply and the jig eliminates vibration of the wire which would prevent accurate layer winding.

Rod 30 not only dampens vibrations between relaying sheave 25 and the jig but counteracts the tendency of sheave 25 to give the wire an outward bow. For this purpose rod 30 is placed nearer to the straight line extending between the jig and sheave axes than to a straight line extending between the wire contacting surfaces of the sheave and jig. Rod 30 tends to put a "reverse" curve in the wire so that it lays down straight and smooth on the sides of the coil.

The wire leaves the source of supply at a point intermediate the vertical planes defining the jig cheek plates 5 and 6 and as the wire travels back and forth along the jig it is inclined from a perpendicular to the jig axis extending through the point of delivery (see Figure 10).

In order to minimize the effect of this inclination of the wire without inconveniently increasing the distance between the jig and the source of supply (particularly when the coil to be wound is of substantial axial breadth) the surfaces of some of the vibration dampers are made convex transversely of the path of the wire so that the tendency of the wire to extend in a straight line from the source of supply is counteracted by its tendency to slide over the convex surface of the damper towards the ends of the dampers. This counteraction is effected automatically and is reversed as soon as the wire passes over the high point of the curve.

The curving of the dampers longitudinally of the path of travel of the wire reduces wear on the wire and dampers and avoids a tendency to kink the wire as it meets and leaves the damper. The elongation of the contact surface of damper 19 to equal or exceed the length of the longest side of jig J further contributes to this desired effect.

Figure 11:
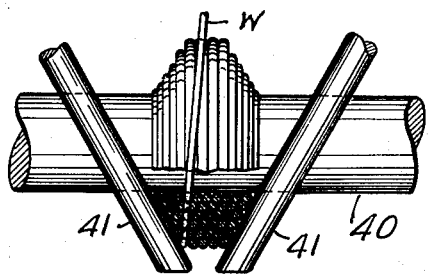
Figure 11 shows an alternate form of layer reversing elements.

Figure 11 shows another form wherein the jig may be any kind of a cheekless arbor 40. The wire W may be wound on it in layers, the reversal of the layers being accomplished when the winding wire contacts stationary layer reversing elements 41. As unsupported coils will only stand up when their axial ends are inclined 30° or more from the perpendicular, it is preferred that the wire contacting surfaces of layer reversing elements 41 be similarly inclined.

Other changes in the details of construction may be made without departing from the spirit of the invention and the exclusive use of those modifications coming within the spirit of the claims is contemplated.

What is claimed is:

1. In a machine for winding a polygonal coil of wire, a rotating jig about which the wire may be wound, a relaying sheave member movable lengthwise of the axis of the jig and from which the material may extend to said jig, a wire-engaging damping member between said relaying sheave member and jig and to one side of a plane between successive wire-engaging faces of said relaying sheave member and jig and over which the wire must pass from the sheave member to the jig, a carrier for at least one of said members, and means for adjusting the carrier away from and towards the jig axis.

2. In a machine for winding a polygonal coil of wire, a rotating jig about which the wire may be wound, a relaying sheave movable lengthwise of the axis of the jig and from which the material may extend to said jig, a wire engaging device between said relaying sheave and jig and to one side of a plane between successive wire-engaging faces of said relaying sheave and jig and over which the wire must pass from the sheave member to the jig, a carrier for both the relaying sheave and the wire engaging device, and means for adjusting the carrier away from and towards the jig axis.

3. In a machine for winding a coil of wire in layers by feeding the wire back and forth lengthwise of the coil axis as the wire is wound about the coil axis, a rotating core, there being spaced stationary guides adjacent the core converging towards each other in a direction extending transversely of the diameter of the coil, means for leading a wire from a source of supply to the core, a device for receiving wire from the core and coils thereon and relaying the wire on the core, said device being movable freely parallel to the core automatically by the inclining of the wire to a perpendicular to the core axis as the wire being laid on the core follows the preceding turn about the core and then as the wire being laid engages one of said guides and rides over and on top of the preceding layer to have its direction of feeding reversed.

4. In a machine for automatically winding wire into a coil, a rotating jig having a core, means for supporting a wire passing from a source of supply to the jig, said means including a sheave spaced from the jig to receive the wire from the jig and to relay it thereon, said sheave being freely rotatable about an axis parallel to jig axis and being freely movable longitudinally of its axis, and a device over which the wire may pass from the source of supply to the jig, said device comprising a stationary rod-like member extending parallel to the jig axis with wire-engaging surfaces inclined to its axis from each end portion towards an intermediate part opposite the source of supply, whereby movement of the wire and sheave lengthwise of the axis of the latter towards a point intermediate the extremes of such movement is resisted by the sliding of the wire along the member and up said inclined surfaces.

5. In a machine for winding wire, a mounting for the wire supply, a rotating jig about which the wire may be wound, a relaying sheave to which wire passes from the jig and from which the wire is relaid upon the jig, a wire-engaging member between said sheave and jig, the sheave and member engaging opposite sides of the wire, and a device for readily adjusting a distance between the sheave and jig axis.

6. A machine as described in claim 2 which includes a support for the wire engaging device movably mounted on the carrier for the relaying sheave and adjustable on said carrier towards and away from the jig axis independently of the relaying sheave.

7. In a machine for winding wire, a rotating jig, about which wire may be wound, a shaft parallelling the axis of said jig, a sheave freely rotatable on said shaft and receiving the wire from the jig and relaying it back on the jig so that the wire may rotate said sheave on said shaft as the wire is drawn past the sheave by the rotation of the jig, a bracket member in fixed relation to the jig axis, a member slidably supported on said bracket member and journaling said shaft, and a member disposed transversely of said jig axis and rotatable in said slidably supported member, two of said members having threaded engagement with each other to provide for close adjustment of the sheave towards and away from the jig.

8. In a machine for winding a wire coil on a rotating jig with successive windings being disposed from one end of the coil to the other end of the coil longitudinally of the jig and back again, a wire relaying sheave spaced from said jig transversely of the axis of the jig and movable freely parallel to said axis under the diagonal pull of the wire between the sheave and the jig, a stationary vibration damper disposed to contact the wire as it travels towards the jig and shaped to resist movement of the winding from the end of the jig to the middle of the jig and to facilitate movement of the winding from the middle of the jig to the end of the jig, and a vibration damper member for engaging the wire after it leaves the jig and before it is engaged by the sheave and having diverging wire-engaging surfaces elonated lengthwise of the jig and extending from the mid-point of the member towards its ends.

9. In a machine for winding wire, a mounting for the wire supply, a rotating jig about which the wire may be wound, a relaying sheave to which wire passes from the jig and from which the wire is relaid upon the jig, and a wire-engaging member between said sheave and jig, opposite sides of the wire engaging said member and sheave simultaneously and a given length of the wire engaging the member and sheave successively to dampen oscillations in the wire.

PENROSE E. CHAPMAN.
PENROSE EMBREE CHAPMAN, Jr.

REFERENCES CITED

The following references are of record in the file of this patent:

UNITED STATES PATENTS

| Number | Name | Date |
|---|---|---|
| 750,206 | Layne | Jan. 19, 1904 |
| 892,659 | Getty | July 7, 1908 |
| 1,167,722 | Scott | Jan. 11, 1916 |
| 1,887,803 | Havlish | Nov. 15, 1932 |
| 2,249,117 | Crandall | July 15, 1941 |
| 2,401,676 | Weber | June 6, 1946 |

FOREIGN PATENTS

| Number | Country | Date |
|---|---|---|
| 526,862 | Great Britain | Sept. 27, 1940 |